Patented June 18, 1940

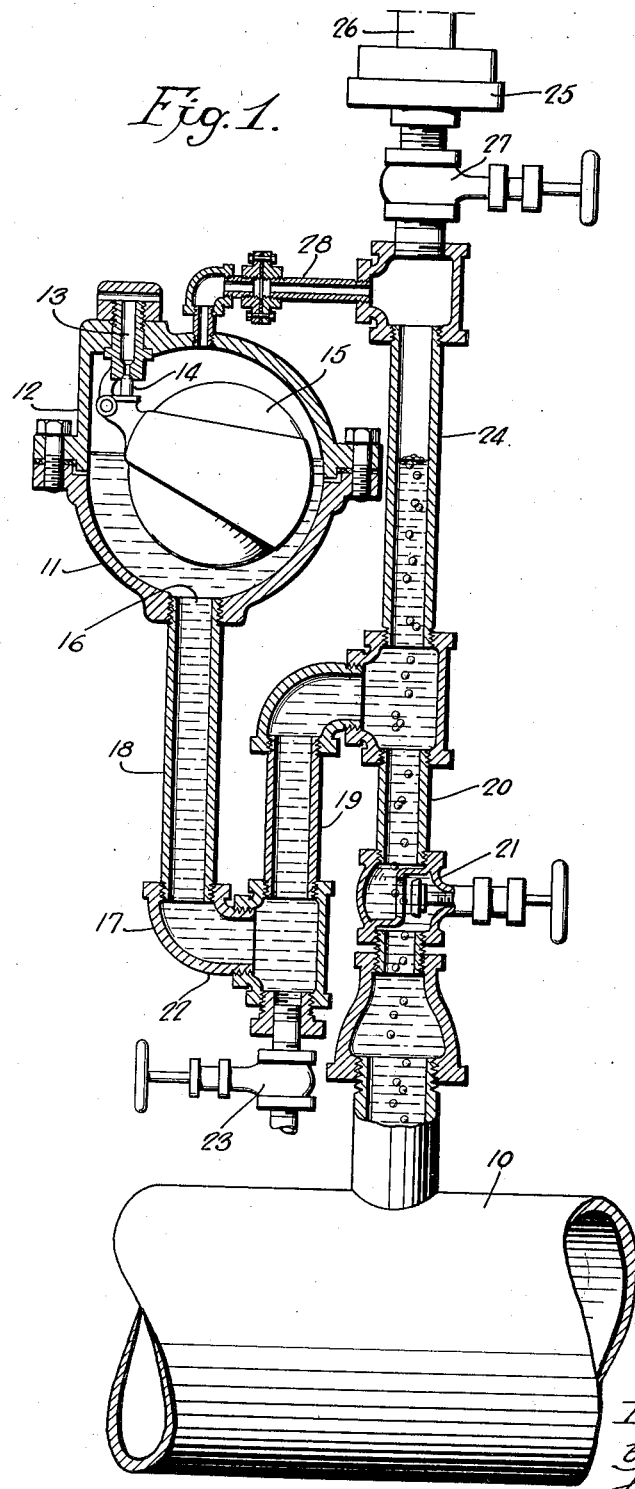

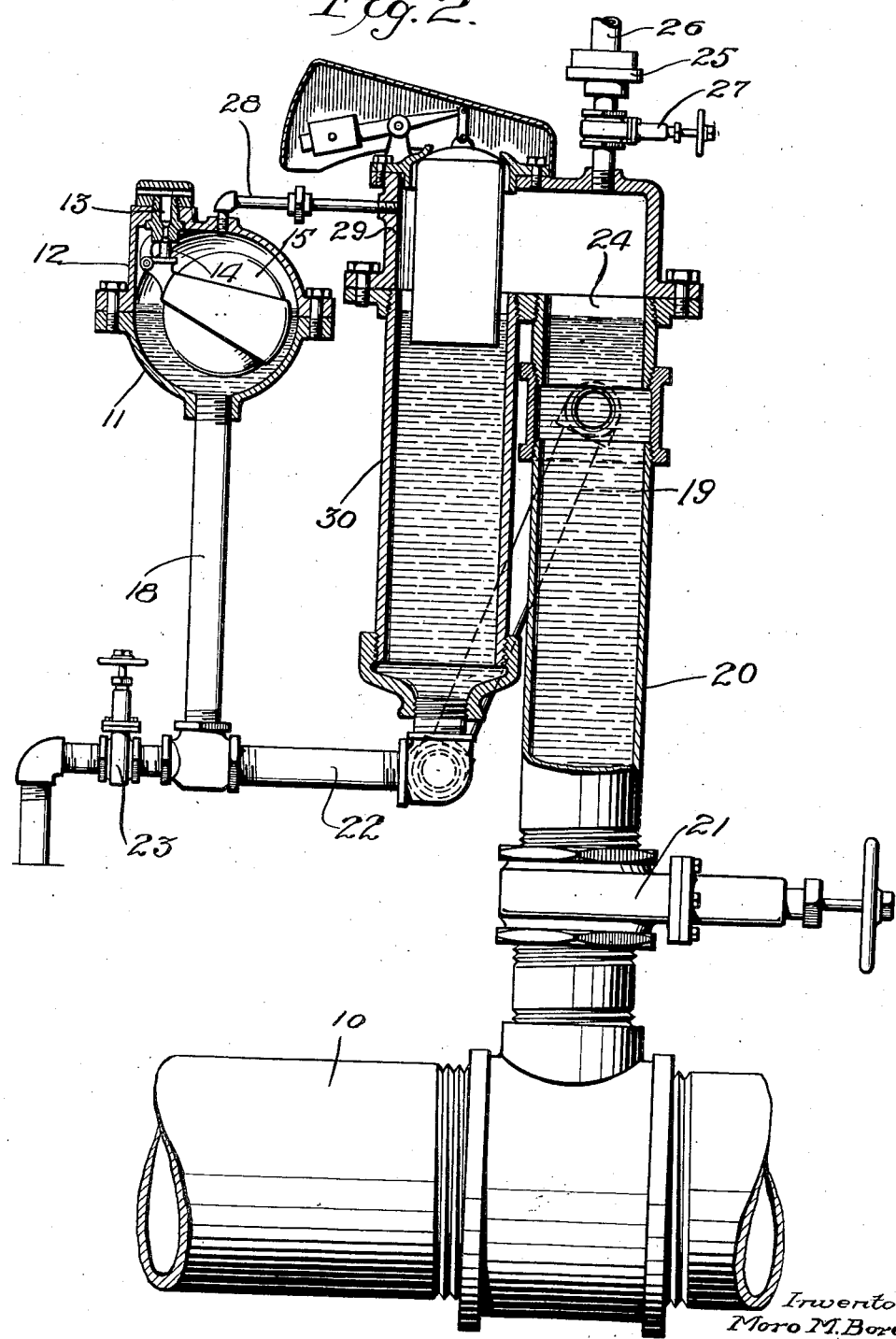

2,204,788

UNITED STATES PATENT OFFICE 2,204,788

AIR RELEASE VALVE FOR SEWAGE LINES

Moro M. Borden, Philadelphia, Pa., assignor to Simplex Valve and Meter Company, Philadelphia, Pa., a corporation of Delaware Application November 27, 1937, Serial No. 176,870

8 Claims. (Cl. 137—69)

This invention relates to air release valves for use in sewage lines or other lines containing liquids loaded with impurities, and has for an important object thereof the provision of a device of this character which will remain in operation for a considerably extended period, as regards an ordinary apparatus of this character, and which may be at all times readily cleansed and restored to operation.

Considerable difficulty is met with in venting gases and air from impurity-laden lines, due to the fact that the impurities are often buoyant and, accordingly, rise to the valve clogging its operation and finally altogether preventing venting. This is particularly true of sewage lines in which the grease content tends to harden and completely clog action of the valve. For this reason, the usual air release valves employed on fluid lines are impractical and must be substituted for by much more expensive forms still requiring constant attention.

A further object of the present invention is the provision of an arrangement whereby the ordinary air release valve may be conveniently employed in such lines.

Another object of the invention is the provision in combination with a structure of the character above noted which will permit a high rate of air inflow into the sewage main or the rapid removal of large volumes of air stored in the pipe, as occasionally becomes necessary when the sewage line is supplied by an intermittently operating pump.

These and other objects I attain by the construction shown in the accompanying drawings, wherein, for the purpose of illustration, I have shown a preferred embodiment of my invention and wherein:

Fig. 1 is a sectional view illustrating an air release valve for sewage lines constructed in accordance with my invention; and Fig. 2 is a modified form of the invention incorporating a vacuum release valve.

Referring now more particularly to the drawings, the numeral 10 indicates a sewage, or other impurity-laden line, and 11 an air release valve of usual construction such, for example, as that shown in my prior Patent No. 1,936,537, issued November 21, 1933, for "Air vacuum valve combined with air release valve." Such valves comprise a chamber 12 having an air vent 13 controlled by a valve 14 which is, in turn, operated through a float ball 15. The lower end of such chamber is provided with an inlet 16 which is usually directly connected through a substantially vertical conduit with the associated main. The float ball will, of course, close the vent 13 when the liquid rises in the chamber to a predetermined level, thus keeping a certain amount of air or gas constantly trapped in the chamber.

In accordance with the present invention, I connect the intake 16 of the air valve with the main 10 through a trap 17, the longer leg 18 of the trap being connected directly to the valve while the shorter leg 19 thereof is connected to the main through a vertical conduit 20 containing a cut-off valve 21. The lower bend 22 of the trap is equipped with an outlet valve 23 which is preferably in direct alignment with the short leg. In vertical alignment with the conduit 20 and in direct communication therewith, I provide a stand pipe 24 the upper end of which extends above the liquid level in release wall 11 and is equipped with means 25 for connection with a source 26 of fluid under pressure, a valve 27 being arranged in the upper end of the stand pipe to close the same. Adjacent its upper end, the stand pipe is connected to the upper portion of the valve chamber 12 through an equalizer vent 28.

In use of the apparatus, prior to communicative connection of the same with the main 10, the entire system is filled with fresh water by closing valves 21 and 23 and opening valve 27 to admit fresh water to the system and fill the same. Valve 27 is then closed and valve 21 opened. Gas, floating solids, and grease will rise in conduit 20 and stand pipe 24, the gas passing over through the equalizer connection 28 to the valve chamber 12 to be vented to the atmosphere. The floating solids, being retained in the stand pipe 24, which comprises a solids collection chamber, cannot interfere with operation of the valve. Obviously, in the course of time the stand pipe will become clogged and the entire apparatus is then cleansed by opening valves 27 and 21, thus forcing the solids from the stand pipe and conduit 20 to return to the main. Valve 21 can then be closed and valve 23 opened to drain the trap and flush the same with clean water, following which this valve is closed and the system refilled with clean water.

It will be obvious that by use of apparatus of this character any standard air release valve may be employed without the probability of its operation being hindered because of floating impurities in the liquid, means being provided to insure against such solids being ultimately delivered to the valve.

In the form of invention shown in Fig. 2, I have combined in the structure of Fig. 1 a vacuum release valve of the type shown in my prior patent above identified. This I accomplish by connecting the casing 29 of the vacuum release valve to the upper end of the stand pipe 24 and providing a connection between the lower end of this casing through a pipe 30 which may constitute a continuation of the casing and the lower end of the trap. The point of communication between the vacuum release valve and the stand pipe 24 is above the maximum liquid level so that it is only possible to transfer air through this connection; the pipe 28 can then be conveniently connected directly to the vacuum release valve casing 29. It will be obvious that, as in the case of the air release valve, the fluid body controlling operation of the vacuum release valve will be kept free from collecting solids so that there will be no interference with the operation of this valve. Use of this valve permits rapid introduction of large quantities of air, as is required in the case of a main supplied by an intermittently operating pump and, furthermore, enables the removal of large volumes of air in a short time when the operation of the pump is renewed.

Since the construction illustrated is obviously capable of considerable modification, I do not wish to be understood as limiting myself thereto except as hereinafter claimed.

I claim:

1. Air release means for impurity-laden liquid lines including a main comprising an air release valve, a chamber with which the valve communicates, a float in the chamber controlling the valve, a trap having its longer leg connected to the lower end of said chamber, a conduit connecting the shorter end of the trap to the main, a stand pipe having its upper end closed and its lower end communicating with the upper end of said conduit, said stand pipe provided adjacent its upper end with a vent communicating with the upper end of the air release valve chamber, a valve in said conduit and means to introduce liquid under pressure to the upper end of said stand pipe.

2. Air release means for impurity-laden liquid lines including a main comprising an air release valve, a chamber with which the valve communicates, a float in the chamber controlling the valve, a trap having its longer leg connected to the lower end of said chamber, a conduit connecting the shorter end of the trap to the main, a stand pipe having its upper end closed and its lower end communicating with the upper end of said conduit, said stand pipe provided adjacent its upper end with a vent communicating with the upper end of the air release valve chamber, a valve in said conduit, a valve in the lower bend of the trap and means to introduce liquid under pressure to the upper end of said stand pipe.

3. The combination with a chamber having a float-valve-controlled air vent adjacent its upper end, a main, a connection between the main and the lower end of said chamber including a trap the longer leg of which is in communication with the lower end of the chamber, a solids collection chamber communicating with the shorter leg of the trap and having connection with the upper end of the valve chamber, and means to force clean fluid through said system from the upper end of the solids collection chamber.

4. Air release means for impurity-laden liquid lines including a main comprising an air release valve, a chamber with which the valve communicates, a float in the chamber controlling the valve, a trap having its longer leg connected to the lower end of said chamber, a conduit connecting the shorter end of the trap to the main, a stand pipe having its upper end closed and its lower end communicating with the upper end of said conduit, said stand pipe provided adjacent its upper end with a vent communicating with the upper end of the air release valve chamber, and a vacuum release valve connected between the upper end of the stand pipe and the lower bend of the trap.

5. Air release means for impurity-laden liquid lines including a main comprising an air release valve, a chamber with which the valve communicates, a float in the chamber controlling the valve, a trap having its longer leg connected to the lower end of said chamber, a conduit connecting the shorter end of the trap to the main, a stand pipe having its upper end closed and its lower end communicating with the upper end of said conduit, said stand pipe provided adjacent its upper end with a vent communicating with the upper end of the air release valve chamber, a valve in said conduit, means to introduce liquid under pressure to the upper end of said stand pipe, and a vacuum release valve connected between the upper end of the stand pipe and the lower bend of the trap.

6. Air release means for impurity-laden liquid lines including a main comprising an air release valve, a chamber with which the valve communicates, a float in the chamber controlling the valve, a trap having its longer leg connected to the lower end of said chamber, a conduit connecting the shorter end of the trap to the main, a stand pipe having its upper end closed and its lower end communicating with the upper end of said conduit, said stand pipe provided adjacent its upper end with a vent communicating with the upper end of the air release valve chamber, a valve in said conduit, a valve in the lower bend of the trap, means to introduce liquid under pressure to the upper end of said stand pipe, and a vacuum release valve connected between the upper end of the stand pipe and the lower bend of the trap.

7. Air release means for impurity-laden liquid lines including a main comprising an air release valve, a chamber with which the valve communicates, a float in the chamber controlling the valve, a trap having its longer leg, comprising a conduit connected to the lower end of said chamber, and its shorter leg, comprising a second conduit, connected to the main, a stand pipe having its upper end closed and its lower end communicating with the upper end of said second conduit, said stand pipe being provided adjacent its upper end with a vent communicating with the upper end of the air release valve chamber, and means to drain said stand pipe and trap and remove collected foreign matter therefrom.

8. The combination with a chamber having a float-valve-controlled air vent adjacent its upper end, a main, a connection between the main and the lower end of said chamber including conduits forming a trap the longer leg of which is in communication with the lower end of the chamber, a solids-collection chamber communicating with the shorter leg of the trap and having connection with the upper end of the valve chamber, and means to drain said solids collection chamber and trap and remove collected foreign matter therefrom.

MORO M. BORDEN.